United States Patent [19]

Shelton

[11] 4,376,524
[45] Mar. 15, 1983

[54] LOW STRESS STEM CONNECTION STRUCTURE FOR A NON-RISING STEM TYPE GATE VALVE

[75] Inventor: William S. Shelton, Houston, Tex.

[73] Assignee: ACF Industries, Incorporated, New York, N.Y.

[21] Appl. No.: 210,424

[22] Filed: Nov. 26, 1980

[51] Int. Cl.³ ............................................. F16K 31/44
[52] U.S. Cl. ................................. 251/86; 251/196; 251/266; 251/327
[58] Field of Search .................................. 251/84, 266

[56] References Cited

U.S. PATENT DOCUMENTS

| 1,221,052 | 4/1917 | Henry | 251/266 |
| 2,705,124 | 3/1955 | Price | 251/266 |
| 3,463,446 | 8/1969 | Natho | 251/84 |
| 3,823,911 | 7/1974 | Natho | 251/167 |

*Primary Examiner*—Harold W. Weakley
*Attorney, Agent, or Firm*—Eugene N. Riddle; Marvin J. Marnock

[57] ABSTRACT

A low stress stem connection structure (77) for connecting the rotatable stem (43) and the gate member (33) of a non-rising stem type gate valve (1). The stem (43) has an externally threaded end section (47) and the gate member (33) has an externally threaded extension (79) with a longitudinal bore (83) in which the end section (47) of the stem (43) is received. A stem nut (87) is threadably received on the end (47) of the stem (43) and engages the gate member extension (79) to reciprocally move the gate member (33) in response to rotation of the stem (43). The gate member (33) may move relative to the longitudinal axis of the stem (43) in the direction of flow of a fluid through the gate valve (1). A gate nut (97) is threadably received on the gate member extension (79) to hold the stem nut (87) in position on the stem (43) and limit movement of the gate member (33). The structure facilitates movement of the gate member (33) to open and close the gate valve (1) even though the gate member (33) is subjected to high fluid pressures.

1 Claim, 10 Drawing Figures

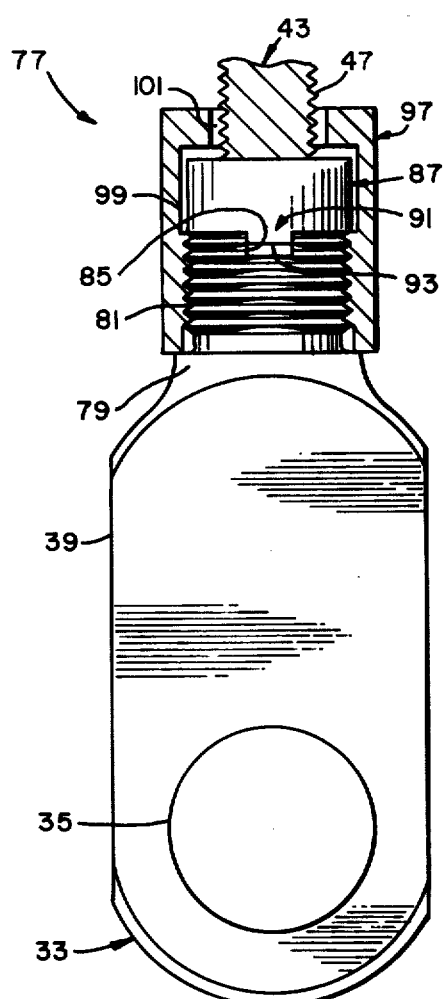
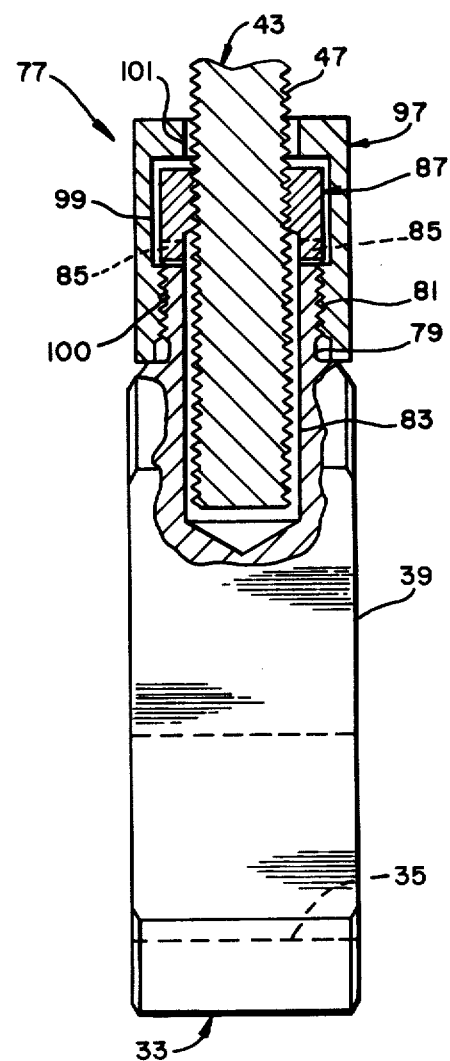
FIG. 3
FIG. 4
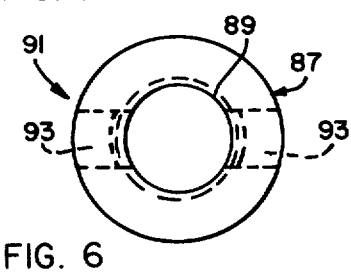
FIG. 6
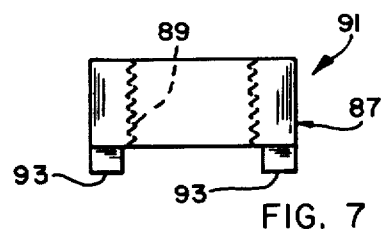
FIG. 7

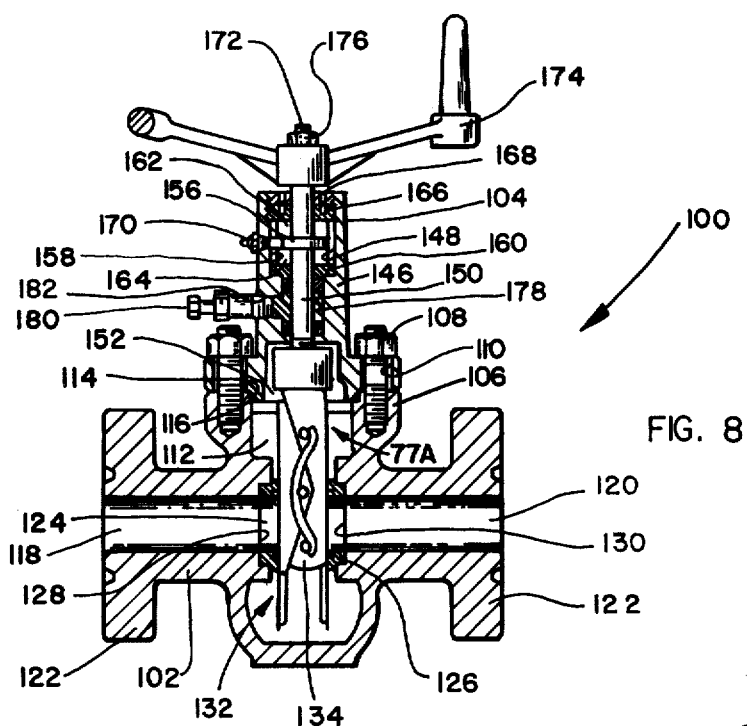
FIG. 8
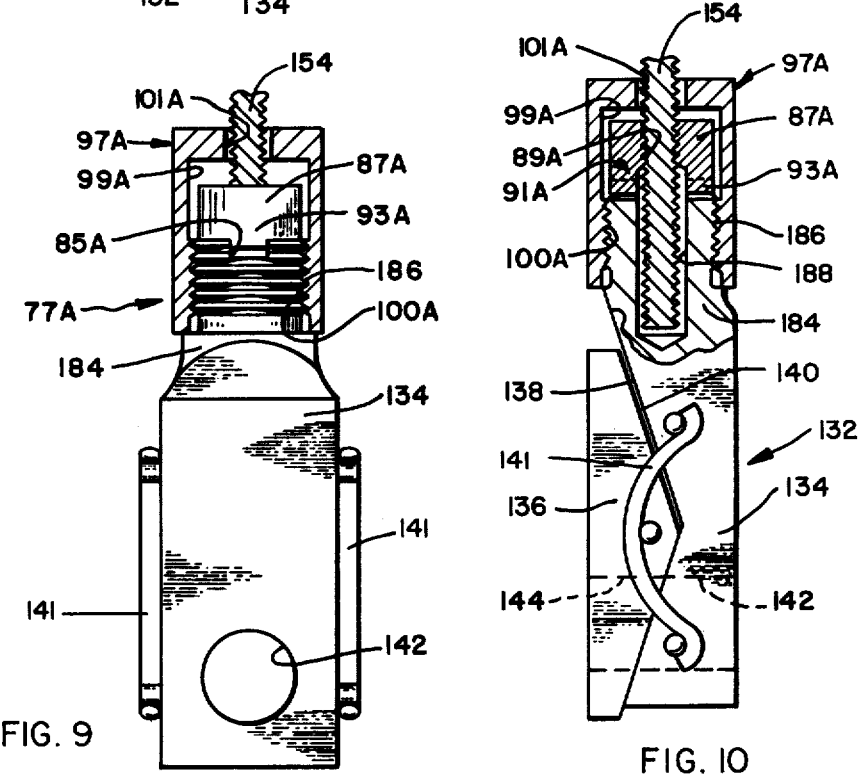
FIG. 9
FIG. 10

LOW STRESS STEM CONNECTION STRUCTURE FOR A NON-RISING STEM TYPE GATE VALVE

BACKGROUND OF THE INVENTION

This invention relates to non-rising stem type gate valves and, more specifically, to such a gate valve having a low stress structure connecting the stem to the valve gate to facilitate opening and closing of the gate valve when it is subjected to high fluid pressures of approximately 5000 psi and above.

Gate valves, both slab type and expanding type, are used in the pipeline industry to control fluid flow and as such are sometimes subjected to high operating pressures (e.g. 5000 psi and above) and fluid flow velocities. One problem occurring when gate valves are used in high fluid pressure installations is the increased thrust and torque requirements encountered when the gate member of the valve is moved between its open and closed positions. It has been found that gate members are deflected as much as ¼° (1/32" to 1/16") from the longitudinal axis of the stem/gate member structure when gate valves are used in these environments. If gate valves are used in sour gas services such as hydrogen sulfide, the stress effects produced can result in hydrogen embrittlement and hydrogen corrosion cracking of the gate member. Thus, there is a need to provide a low stress stem connection between the valve stem and gate member in a non-rising stem type gate valve that accommodates high fluid pressures.

U.S. Pat. No. 3,463,446 issued to Natho describes a low stress stem connection for a rising stem type gate valve in which the problems described above are eliminated or at least their effects reduced. However, this specific structure is not applicable to a non-rising type gate valve due to the operational differences therebetween. In a rising stem gate valve the stem is fixedly connected to the gate and moves in a direction along its longitudinal axis upon the rotation thereof. Essentially, the gate and valve stem do not move relative to one another in a direction along the longitudinal axis of the stem. In a non-rising stem type gate valve the stem is fixed within the valve body so that upon rotation the stem does not move in a direction along its longitudinal axis. The stem is threadedly connected to the gate member in a fashion so that the rotation of the stem will cause the gate to move relative to the stem in a direction along the longitudinal axis of the stem. U.S. Pat. No. 243,846 issued to Buick, U.S. Pat. No. 659,234 issued to Hughes and U.S. Pat. No. 2,726,842 issued to Seamark are exemplary of the non-rising stem type valve.

The U.S. Pat. No. 3,223,380 issued to Hochmuth et al. shows a stem-gate connection in a non-rising stem type gate valve. However, excessive material must be removed from the extension in the gate member of the structure shown in U.S. Pat. No. 3,223,380 so that the extension, and consequently, the width of the gate, must be made thicker so as to possess the requisite strength to accommodate higher fluid pressures. If it is not thickened, it cannot accommodate higher fluid pressures. Although the requisite strength can be achieved by increasing the thickness of the gate member, a thick gate member is not desirable from a manufacturing standpoint. This is especially true in expanding gate valves where the total thickness of the gate and segment is an important manufacturing consideration. An expanding gate valve is illustrated in U.S. Pat. No. 4,116,419 to Diehl et al. It would therefore be highly desirable to provide a low stress stem connection structure for connecting a valve stem and a gate member for a non-rising stem type gate valve that has a gate of an acceptable thickness and that can accommodate high fluid pressures.

SUMMARY OF THE INVENTION

Therefore, it is an object of the invention to provide an improved low stress stem connection structure for a non-rising stem type gate valve that accommodates high fluid pressures.

It is another object of the invention to provide a low stress stem connection for a non-rising stem type gate valve that does not require excessive amounts of material removed from the extension of the gate member.

It is another object of the invention to provide a low stress stem connection for a non-rising stem type gate valve that can accommodate high fluid pressures and still have a gate member of an acceptable thickness.

The invention is a low stress stem connection structure for connecting a rotatable stem and a gate member of a non-rising stem type gate valve in which the stem has an externally threaded end section and the gate member has an externally threaded extension with a longitudinal bore in which the end section of the stem is received. A stem nut is threadably received on the end of the stem and has means for engaging the extension of the gate member to reciprocally move the gate member in response to rotation of the stem in one direction or the other. The engaging means permits movement of the gate member relative to the longitudinal axis of the stem in the direction of flow of a fluid through the gate valve. A gate nut is threadably received on the gate member extension to hold the stem nut in position and limit movement of the gate member. The structure facilitates movement of the gate member to open and close the gate valve even though the gate member is subjected to high fluid pressures. The stem connection structure can be utilized with both slab gate valves and expanding gate valves of the non-rising stem type.

BRIEF DESCRIPTION OF THE DRAWINGS

FIG. 3 is a front elevational view, partly in section, of a slab gate member of the slab gate valve illustrating the low stress stem connection of the present invention;

FIG. 4 is a side elevational view, partly in section, of the slab gate member shown in FIG. 3;

FIG. 6 is an enlarged bottom plan elevational view of the stem nut of FIG. 1 used in the present invention;

FIG. 7 is an enlarged side elevational view of the stem nut of FIG. 1 used in the present invention;

FIG. 8 is a side elevational view, a portion in section, of a non-rising stem type expanding gate valve using a low stress stem connection structure of the present invention, the expanding gate valve shown in the open position;

FIG. 9 is a front elevational view, partly in section, of the expanding gate assembly shown in FIG. 8, and FIG. 10 is a side elevational view, partly in section, of the expanding gate assembly shown in FIG. 8.

DETAILED DESCRIPTION OF SPECIFIC EMBODIMENTS

Figures 1, 2:
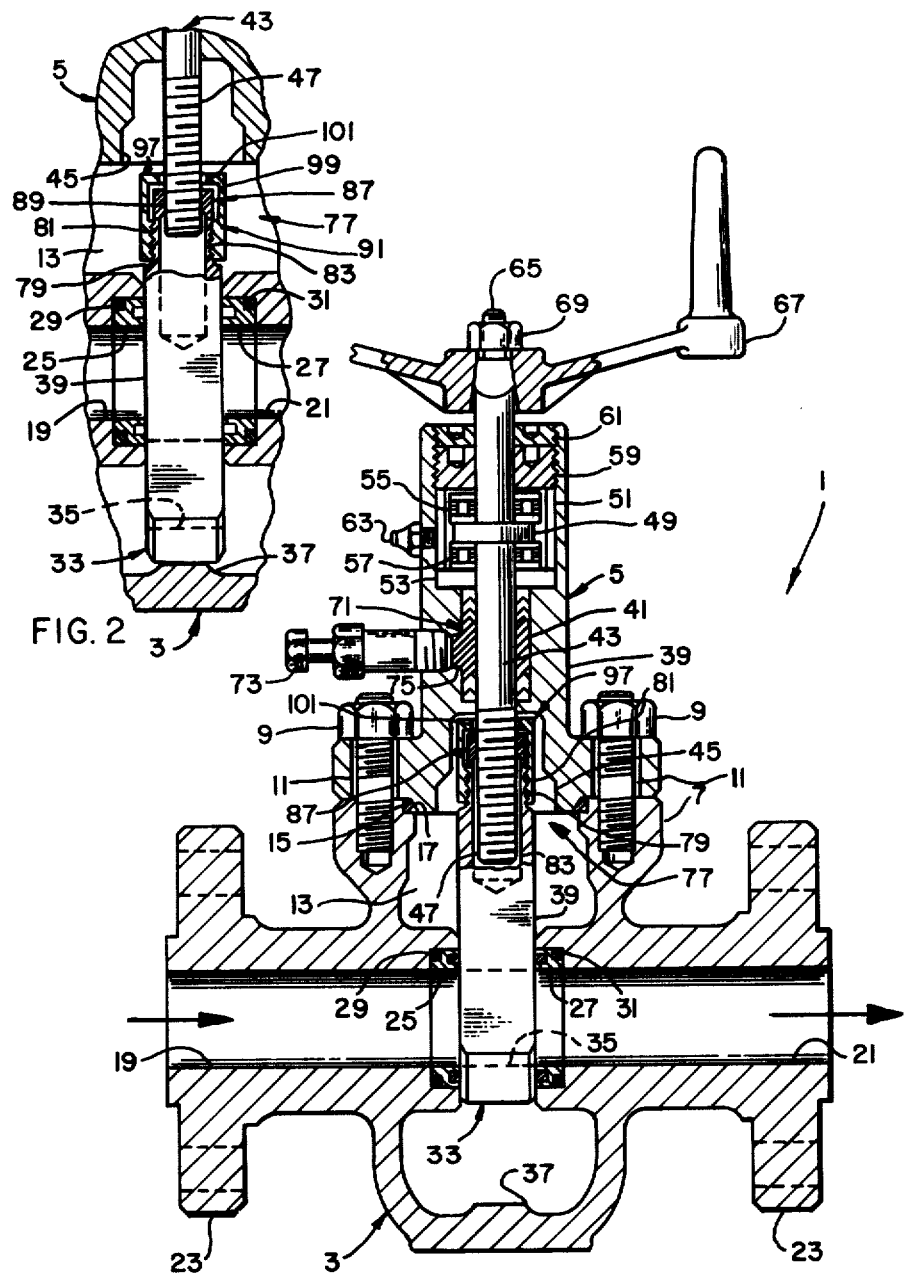
FIG. 1 is a side elevational view, a portion in section, of a non-rising stem type slab gate valve using a low stress stem connection structure of the present invention, the slab gate valve is illustrated in the open position.
FIG. 2 is a partial sectional view of the slab gate valve of FIG. 1, the slab gate valve is illustrated in the closed position.

Referring to the drawings and specifically FIG. 1, a non-rising stem type slab gate valve for use in pipelines or related installations utilizing the low stress stem connection of the present invention is illustrated and indicated generally as 1. Valve 1 is comprised of a valve body 3 and a bonnet assembly 5 which is attached to an upper flange portion 7 of valve body 3 by a plurality of bolts 9. The bolts are threaded into valve body 3 and extended through openings 11 in bonnet assembly 5. Bonnet assembly 5 forms a closure for an open ended valve chamber 13 defined by the annular flanged portion 7 of the valve body. A sealing member 15 is positioned in an annular groove 17 defined between valve body 3 and bonnet assembly 5 and seals between valve body 3 and bonnet assembly 5. Sealing member 15 may be of an elastomeric or soft malleable metallic material depending upon the type service and operating pressure ranges with which gate valve 1 is used. Valve body 3 has inlet and outlet fluid passages 19 and 21, respectively, which are in fluid communication with valve chamber 13. Further, the valve body is provided with connection flanges or structures 23 at the outer ends of passages 19 and 21 for connecting gate valve 1 into a fluid carrying pipeline or similar installation.

A pair of annular seat members 25 and 27 are retained in generally parallel annular seat recesses 29 and 31, respectively, disposed about flow passages 19 and 21 respectively, adjacent valve chamber 13. A gate member 33 is disposed between seat members 25 and 27 for reciprocal movement within valve chamber 13. Gate member 33 has a port 35 for alignment with flow passages 19 and 21 in the open position of the valve as illustrated in FIG. 1. As illustrated in FIG. 2, valve body 3 has a valve stop 37 against which the bottom of gate member 33 rests when the valve is closed, so that a solid portion 39 of gate 33 is interposed between the flow passages when the gate valve is closed to block flow of fluid through the gate valve.

Bonnet assembly 5 has an upwardly extending central projection 39 in which is formed a longitudinal passage 41 for a non-rising valve stem 43. The lower end of passage 41 opens into a cavity 45 formed in the base of bonnet assembly 5 and valve stem 43 extends through this cavity and into valve chamber 13. The lower end section 47 of stem 43 (the portion of the stem extending out of passage 41) is threaded and the stem has an annular collar 49 at its upper end. The upper end of passage 41 opens into an enlarged diamter chamber 51 which is threaded at its upper or outer end. The collar portion of stem 43 is positioned within this chamber with a stem guide 53 being located at the bottom of the chamber. Upper and lower thrust bearings 55 and 57 are respectively positioned above and below collar 49 with the lower thrust bearing seating atop the stem guide. A packing retainer 59 and a lock nut 61 are threadably received in the upper end of the chamber 51, the packing retainer being installed first and, after its adjustment, the lock nut being installed. Lubrication of bearings 55 and 57 may be of permanent or sealed type or lubrication may be effected by introducing lubricant through a fitting 63. The upper end of stem 43 is tapered and terminates in a reduced diameter threaded section 65. A hand-wheel 67 fits over the tapered portion of the stem and is secured to the upper end of the stem by a nut 69.

Stem passage 41 defines an annular packing chamber within bonnet assembly 5 and a packing assembly 71 is disposed within this chamber to form a fluid tight seal between valve stem 43 and the bonnet assembly. Packing assembly 71 may include any of a number of commercially available packing materials. A packing fitting 73 is threadably received in a lateral passage 75 extending from the packing chamber to the outside of the bonnet assembly. Packing material within packing assembly 71 is replenished via this fitting.

Figure 5:
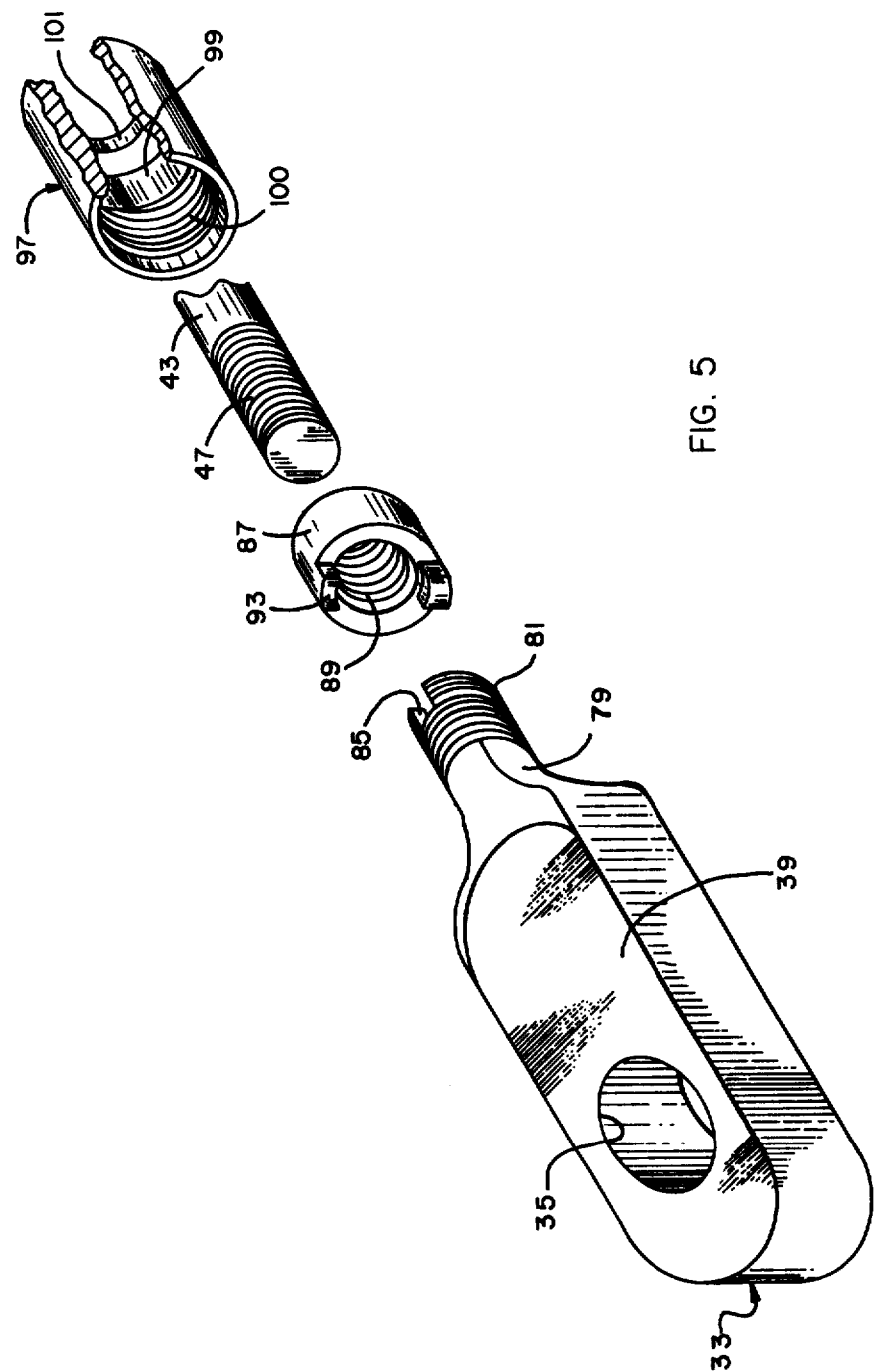
FIG. 5 is an exploded perspective view illustrating the elements comprising the low stress stem connection structure of the present invention.

Referring particularly to FIGS. 3–5, the low stress stem connection structure of the present invention is indicated generally at 77. As is illustrated, gate member 33 has an integral extension 79 at its upper end which is externally threaded as indicated at 81. In addition, extension 79 has a longitudinal bore 83 in which threaded end section 47 of stem 43 is received. As illustrated in FIG. 4, bore 83 is not threaded and has a diameter that is somewhat larger than the diameter of stem 43. In addition, and as illustrated in FIGS. 3 and 5, gate member 33 has a pair of aligned slots 85 at the upper end of extension 79.

It should be noted that the only material removed from applicant's extension 79 is due to the bore 83 and slots 85. The amount of material removed from applicant's gate member extension is less than that removed from the gate member of U.S. Pat. No. 3,223,380 in which a vertical passage and a transverse passage are formed. Hence, with gate members of the same thickness and material, applicant's gate member would possesses greater strength than that of U.S. Pat. No. 3,223,380.

The low stress stem connection structure further includes a stem nut 87 which is threadably received on end section 47 of stem 43. For this purpose, the stem nut has a threaded central bore 89. The stem nut includes an engaging means 91 for engaging extension 79 of gate member 33 to reciprocally move the gate member in response to rotation of stem 43 in one direction or the other. This engaging means 91 comprises a pair of ears 93 which depend downwardly from stem nut 87 and are received in their corresponding slots 85. The engagement between ears 93 and the sides of the slots 85 prevents stem nut 87 from rotating relative to gate member 33 so that the rotary movement of stem 43 is translated to vertical movement of gate member 33.

A gate nut 97 of cylindrical cup shape has a longitudinal bore 99 of a diameter that is slightly larger than the diameter of extension 79 of gate member 33. The outer end of bore 99 is reduced to a diameter the same as that of extension 79 and this reduced diameter section is internally threaded at 100 for the gate nut to be threadably received on the extension. The base of the gate nut has an opening 101 communicating with bore 99 and coaxially aligned therewith. Opening 101 is larger in diameter than the diameter of stem 43, but smaller in diameter than the diameter of stem nut 87. This particular size relationship between the opening in the gate nut, the stem and the stem nut allows gate nut 97 to loosely fit about stem 43 when gate nut 97 is attached to gate member extension 79 while simultaneously holding stem nut 87 in position on the stem.

During assembly of gate valve 1, gate nut 97 is first fitted over the threaded end of stem 43. Secondly, stem nut 87 is threaded onto the end of stem 43. Thirdly, gate member 33 is then positioned so the end of stem 43 is received in bore 83 and ears 93 of stem nut 87 fit in slots 85 on gate member extension 79. Lastly, the gate nut is screwed onto gate member extension 79 so stem nut 87 is positioned within bore 99 of gate nut 97. Gate nut 97, when connected to the gate member, strengthens the gate member extension 79 and hence allows the gate valve to accommodate high fluid pressures.

Referring to FIGS. 8 and 9 an expanding type of gate valve 100 is illustrated. Valve 100 is comprised of a valve body 102 and a bonnet assembly 104 which is attached to an upper flange portion 106 of valve body 102 by a plurality of bolts 108. The bolts are threaded into valve body 102 and extend through openings 110 in bonnet assembly 104. Bonnet assembly 104 forms a closure for an open ended valve chamber 112 defined by the annular flanged portion 106 of the valve body. A sealing member 114 is positioned in an annular groove 116 defined between valve body 102 and bonnet assembly 104 and seals between valve body 102 and bonnet assembly 104. Sealing member 114 may be of an elastomeric or soft malleable metallic material depending upon the type service and operating pressure ranges with which expanding gate valve 100 is used. Valve body 102 has inlet and outlet fluid passages 118 and 120, respectively, which are in fluid communication with valve chamber 112. Further, the valve body is provided with connection flanges or structures 122 at the outer ends of passages 118 and 120 for connecting expanding gate valve 100 into a fluid carrying pipeline or similar installation.

A pair of annular seat members 124 and 126 are retained in generally parallel annular seat recesses 128 and 130, respectively, disposed about flow passages 118 and 120, respectively, adjacent valve chamber 112.

An expanding gate assembly 132 is disposed between seat members 124 and 126 for reciprocal movement within valve chamber 112. Expanding gate assembly 132 includes a gate element 134 and a complementary segment 136. Gate element 134 has a V-shaped recess 138 and segment 136 has a V-shaped face 140. The V-shaped recess and face complement each other so that V-shaped face 140 fits within recess 138 when gate element 134 and segment 136 are in a fully collapsed position. A pair of springs 141 extends between the sides of gate element 134 with segment 136 for continuously urging them into their fully collapsed position.

When the gate valve 100 is in a closed position (not illustrated), ports 142 and 144 are not aligned with flow passages 118 and 120, and the gate assembly is interposed between the flow passages to block flow of fluid through the gate valve.

Bonnet assembly 104 has an upwardly extending central projection 146 in which is formed a longitudinal passage 148 for a non-rising valve stem 150. The lower end of passage 148 opens into a cavity 152 formed in the base of bonnet assembly 104 and valve stem 150 extends through this cavity and into valve chamber 112. The lower end section 154 of stem 150 (the portion of the stem extending out of passage 148) is threaded and the stem has an annular collar 156 at its upper end. The upper end of passage 154 opens into an enlarged diameter chamber 158 which is threaded at its upper or outer end. The collar portion of stem 150 is positioned within this chamber with a stem guide 160 being located at the bottom of the chamber. Upper and lower thrust bearings 162 and 164 are respectively positioned above and below collar 156 with the lower thrust bearing seating atop the stem guide. A packing retainer 166 and a lock nut 168 are threadably received in the upper end of the chamber 158, the packing retainer being installed first and, after its adjustment, the lock nut being installed. Lubrication of bearings 162 and 164 may be of a permanent or sealed type or lubrication may be effected by introducing lubricant through a fitting 170. The upper end of stem 150 is tapered and terminates in a reduced diameter threaded section 172. A handwheel 174 fits over the tapered portion of the stem and is secured to the upper end of the stem by a nut 176.

Stem passage 148 defines an annular packing chamber within bonnet assembly 104 and a packing assembly 178 is disposed within this chamber to form a fluid tight seal between valve stem 150 and the bonnet assembly. Packing assembly 178 may include any of a number of commercially available packing materials. A packing fitting 180 is threadably received in a lateral passage 182 extending from the packing chamber to the outside of the bonnet assembly. Packing material within packing assembly 178 is replenished via this fitting.

Since the low stress stem connection is the same for both a slab and an expanding type of gate valve, the reference numerals used for the connection utilized with the expanding gate valve will not change from those of the slab gate valve except that an "A" will be placed thereafter. The low stress stem connection structure of the present invention is indicated generally at 77A. As is illustrated, gate element 134 has an integral extension 184 at its upper end which is externally threaded as indicated at 186. In addition, extension 184 has a longitudinal bore 188 therein in which threaded end section 154 of stem 150 is received. Bore 188 is not threaded and has a diameter that is somewhat larger than the diameter of stem 150. In addition, gate element 134 has a pair of aligned slots 85A at the upper end of extension 184.

The low stress stem connection structure further includes a stem nut 87A which is threadably received on end section 154 of stem 150. For this purpose, the stem nut has a threaded central bore 89A. The stem nut includes an engaging means 91A for engaging extension 184 of gate element 134 to reciprocally move the gate assembly in response to rotation of stem 150 in one direction or the other. This engaging means 91A comprises a pair of ears 93A which depend from stem nut 87A and are received in their corresponding slots 85A. The engagement between ears 93A and the sides of the slots 85A prevents stem nut 87A from rotating relative to gate element 134 so that the rotary movement of stem 150 is translated to vertical movement of the gate assembly.

A gate nut 97A of cylindrical cup shape has a longitudinal bore 99A of a diameter that is slightly larger than the diameter of extension 184 of gate element 134. The outer end of bore 99A is reduced to a diameter the same as that of extension 184 and this reduced diameter section is internally threaded at 100A for the gate nut to be threadably received on the extension. The base of the gate nut has an opening 101A communicating with bore 99A coaxially aligned therewith. Opening 101 A is larger in diameter than the diameter of stem 150, but smaller in diameter than the diameter of stem nut 87A. This particular size relationship between the opening in the gate nut, the stem and the stem nut, allows gate nut 97A to loosely fit about stem 150 when gate nut 97A is attached to gate member extension 184 while simultaneously holding stem nut 87A in position on the stem.

During assembly of gate valve 100, gate nut 97A is first fitted over the threaded end of stem 150. Secondly, stem nut 87A is threaded onto the end of stem 150. Thirdly, gate element 134 is then positioned so the end of stem 150 is received in bore 83A and ears 93A of stem nut 87A fit in slots 85A on gate member extension 184. Lastly, the gate nut is screwed onto gate member extension so stem nut is positioned within bore 99A of gate nut 97A. Gate nut 97A, when connected to the gate member, strengthens the gate member extension 184 and hence allows the gate valve to accommodate high fluid pressures.

In operation, when gate member 33 or gate assembly 132 of either slab gate valve 1 or expanding gate valve 100, respectively, is moved between open and closed positions, the slab gate or expanding gate assembly is subjected to high fluid pressures which tend to move them downstream. In structures that do not utilize a stem-gate connection such as applicant's, such movement will place unwanted stress on the slab gate or gate element of the expanding gate assembly and stem. However, the above described stem-gate connection permits the gate member or element to move transversely relative to the longitudinal axis of stem 43 (or 150) in response to fluid pressure. Thus, the gate member (or element) may slightly move in a downstream direction to the right as viewed in FIG. 1 or 8 in response to fluid pressure because the ears of the stem nut do not rigidly engage the gate member or element. The degree of movement of the gate member or element is limited by the gate nut so that even at the outer limits of the movement of the gate member or element the ears of the stem nut are retained in the slots so that rotary movement of the stem produces vertical movement of the gate member or assembly between its open and closed positions. More importantly, the stress to which the gate member or gate element and stem are subjected is much less than that experienced with conventional gate valve assemblies where the gate member or element is connected to the non-rising stem without any means to permit relative movement axially of the flowline in the closed position of the gate member. Consequently, movement of the gate member or assembly between its open and closed positions is facilitated and the potential for stress cracking, hydrogen embrittlement and hydrogen corrosion cracking are reduced.

Further, as previously mentioned, the increased strength of a stem-gate connection such as applicant's, as opposed to one exemplified by U.S. Pat. No. 3,223,380, allows applicant's stem-gate connection to be utilized with non-rising stem type gatee valves (both slab and expanding types) in high fluid pressure applications without compromising manufacturing considerations.

In view of the above, it will be seen that the several objects of the invention are achieved and other advantageous results obtained.

As various changes could be made in the above constructions without departing from the scope of the invention, it is intended that all matter contained in the above description and shown in the accompanying drawing shall be interpreted as illustrative and not in a limiting sense.

What is claimed is:

1. A gate valve comprising:

a valve body in which is formed an open ended valve chamber and inlet and outlet fluid passages communicating with the valve chamber, a valve seat positioned about each said inlet and outlet fluid passages adjacent said valve chamber, a bonnet assembly forming a closure for said valve chamber, an axially rotatable non-rising valve stem carried by said bonnet assembly and having a threaded inner end section;

a gate member disposed in said valve chamber and movable between open and closed positions relative to said fluid passages to control fluid flow through said valve, said gate member having an externally threaded extension with a longitudinal bore in which the inner end section of said stem is received, said longitudinal bore having a diameter substantially larger than the diameter of the stem to provide a clearance between the stem and the gate member, the upper end of the gate extension having a pair of opposed slots aligned in a direction parallel to the direction of fluid flow through said flow passages;

a stem nut threaded on an end of said stem and having a pair of ears fitting within said opposed slots whereby rotation of said stem effects movement of said gate member between open and closed positions; and interfitting ears and slots, and the clearance between the stem and gate member, permitting movement of said gate member relative to the longitudinal axis of said stem in the direction of fluid flow through said fluid passages; and, an inverted cup-shaped gate nut threaded onto the externally threaded extension of said gate member and enclosing said stem nut, said gate nut having an opening in its upper end receiving said stem and providing a clearance between said gate nut and said stem to permit said movement of said gate member relative to the longitudinal axis of said stem in the direction of fluid flow through said flow passages whereby a low stress connection is formed between said stem and said gate member to facilitate opening and closing of the gate valve.

* * * * *